United States Patent Office 3,443,614
Patented May 13, 1969

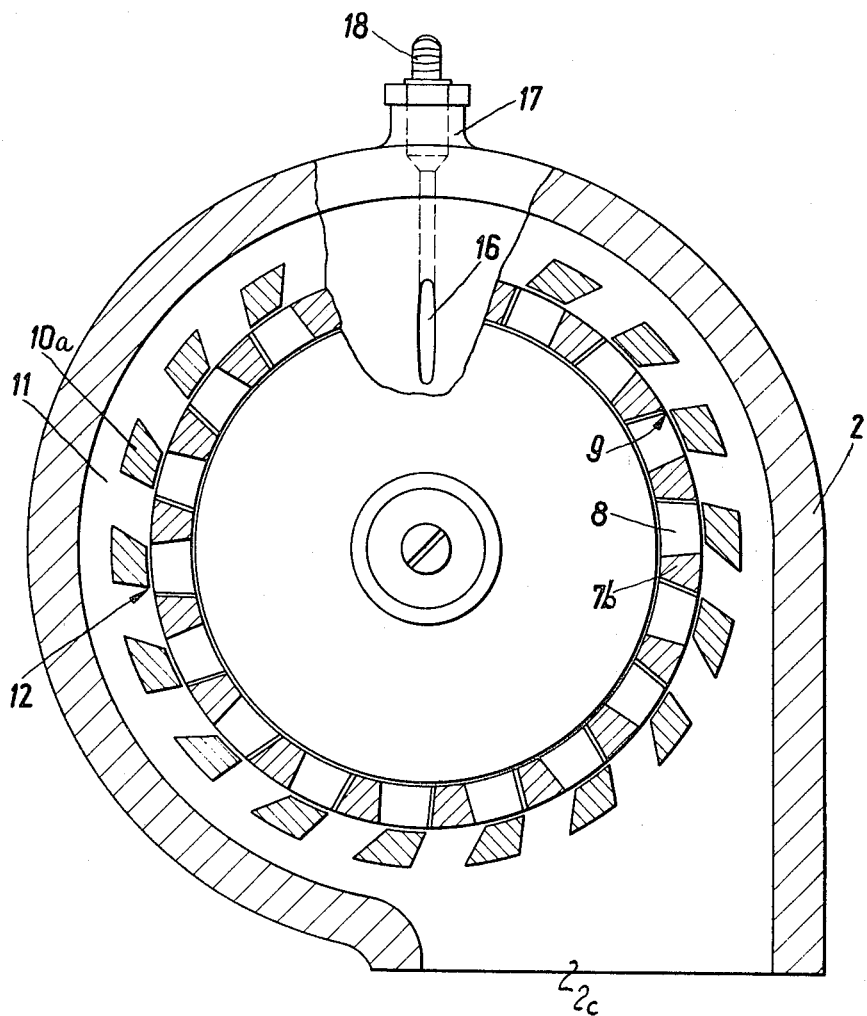

3,443,614
COMMINUTING APPARATUS
Fritz Otto, Hameln, Germany, assignor, by mesne assignments, to Belder Trust, Reg., Vaduz, Liechtenstein
Filed Nov. 3, 1966, Ser. No. 591,883
Claims priority, application Germany, Nov. 25, 1965, St 24,688
Int. Cl. A47g 43/04; B02c 18/08, 19/00
U.S. Cl. 146—192    10 Claims

ABSTRACT OF THE DISCLOSURE

A comminuting apparatus has a housing including a peripheral side wall and a bottom wall, the latter being provided with an upper surface. A rotary cutting member located in the housing and has a lower surface adjacent to but slightly spaced from the upper surface of the bottom wall so that the two surfaces define with each other a gap extending radially of the axis of rotation of the cutting member. A discharge passage is provided in the housing and communicates with the gap, and means is provided for admitting a washing fluid into the passage and from there into the gap.

---

Figure 1:
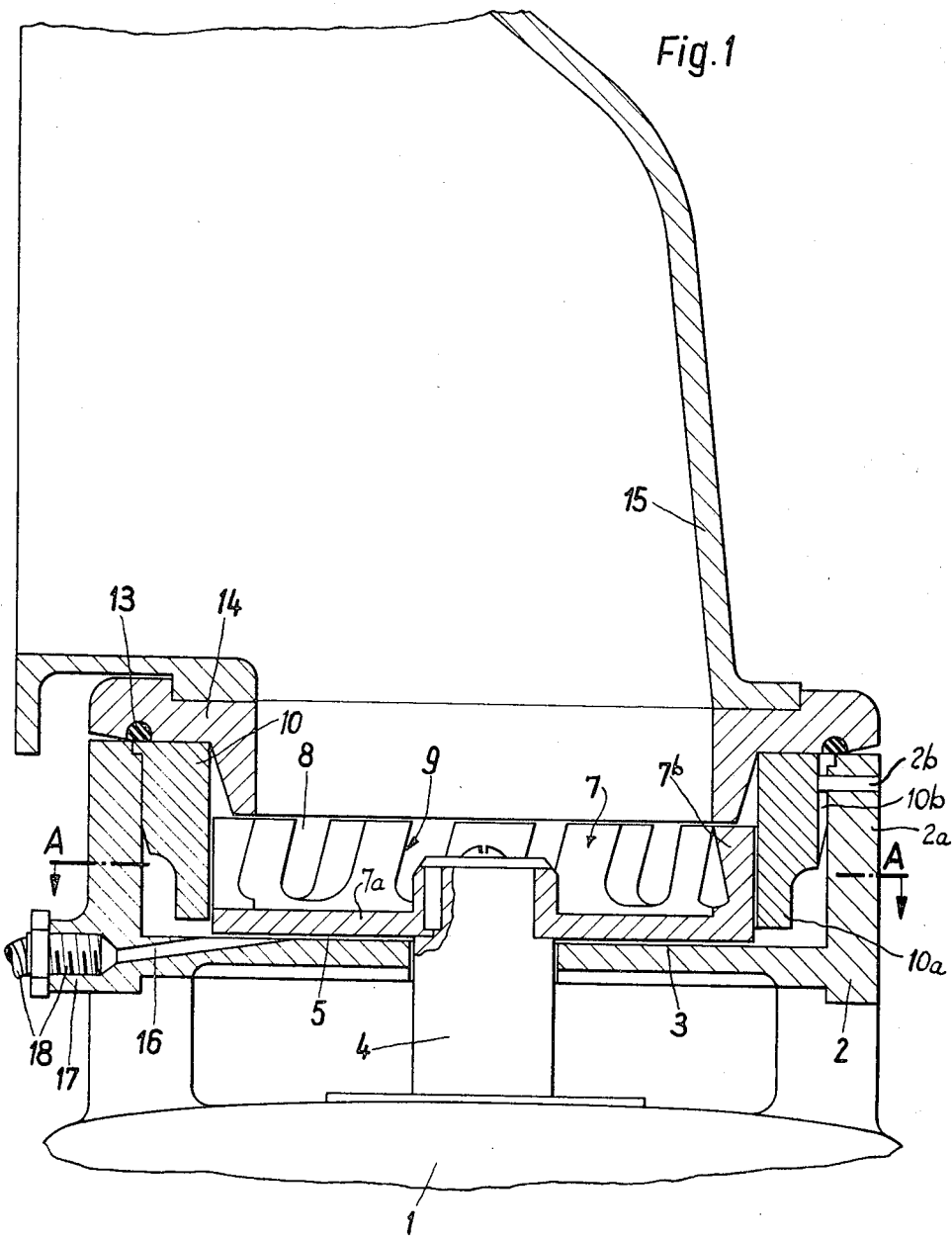

The present invention relates to apparatus for comminuting raw or cooked meat and similar substances. More particularly, the invention relates to improvements in comminuting apparatus of the type wherein a first cutting member having an annulus of comminuting teeth rotates with reference to a second cutting member. The teeth of the rotary cutting member rotate with reference to a surrounding annulus of stationary teeth on the second cutting member and the rotary cutting member comprises a disk-shaped platform which is adjacent to the housing and is rotated by the output shaft of an electric drive motor. Material to be comminuted is fed into the space within the annulus of teeth on the rotary cutting member and is moved radially outwardly by centrifugal force to undergo a thorough comminuting action during travel between the cutting edges of rotary and stationary teeth.

Such comminuting apparatus have gained widespread acceptance in various food processing industries as well as by individual users. However, it was foud that the relatively narrow gap between the rotary cutting member and the housing often accumulates particles of comminuted material and that evacuation of such particles consumes too much time, mainly because the gap can be reached only upon complete or nearly complete dismantling of the apparatus.

Accordingly, it is an important object of the present invention to provide a comminuting apparatus of the above outlined characteristics with a very simple, reliable and inexpensive device which will enable the operator to rapidly expel any comminuted particulate material that might accumulate in the gap between rotary and stationary parts of the apparatus and which can carry out such expulsion without necessitating even partial dismantling of the apparatus.

Another object of the invention is to provide a comminuting apparatus wherein the time required for indispensable regular washing of parts which come in actual contact with meat or other perishable substances is reduced to a minimum without in any way affecting the thoroughness of the cleaning action.

An additional object of the invention is to provide a comminuting apparatus for raw or cooked meat wherein the cleaning device can expel comminuted material which is entrapped between stationary and rotary parts and wherein the action of such cleaning device can be enhanced by driving the rotary part or parts in the course of the cleaning action.

A concomitant object of the invention is to provide a comminuting apparatus which can be cleaned by means of a readily available washing media, such as cold or hot water or steam.

Briefly stated, one feature of my invention resides in the provision of a comminuting apparatus for raw or cooked meat and similar substances. The apparatus comprises a housing including a wall preferably located in a substantially horizontal plane and provided with an outer surface which faces upwardly if the wall is horizontal, a rotary cutting member having an outer surface adjacent to the outer surface of the wall and defining therewith a relatively narrow gap which is preferably of constant or nearly constant width, a passage provided in the housing (preferably in the aforementioned wall) and having a discharge end in communication with the gap, and means for admitting hot, cold or tepid water, steam or another washing fluid into the passage to expel particles of comminuted material which might have been entrapped in the gap. The action of the washing medium will be improved if the cutting member rotates at the time such medium is being admitted through the passage, and the discharge end of the passage preferably directs the jet or jets of washing fluid toward the axis of the cutting member.

The fluid admitting means may comprise a nipple provided on the housing and having a bore which communicates with the aforementioned passage. The nipple can be connected with a source of washing fluid by a flexible hose or another conduit.

The novel features which are considered as characteristic of the invention are set forth in particular in the appended claims. The improved comminuting apparatus itself, however, both as to its construction and the mode of operating and cleaning the same, together with additional features and advantages thereof, will be best understood upon perusal of the following detailed description of a specific embodiment with reference to the accompanying drawings, in which:

FIG. 1 is a fragmentary axial section through a comminuting apparatus which embodies my invention; and FIG. 2 is a horizontal section as seen in the direction of arrows from the line A—A of FIG. 1.

Referring to the drawings in detail, the comminuting apparatus comprises an upright cylindrical housing 2 accommodating an electric drive motor 1 whose output shaft 4 extends upwardly and with some clearance through a horizontal wall 3 of the housing. The upper or outer surface of the wall 3 is closely adjacent to but is still spaced from the exposed or outer surface at the underside of a rotary cutting member 7 which is affixed to and is rotatable by the output shaft 4. The adjoining surfaces of the wall 3 and cutting member 7 define between themselves a narrow annular clearance or gap 5 which is of substantially constant width and is hard to reach unless the cutting member 7 is actually removed. The bottom wall or platform 7a of the cutting member 7 is immediately adjacent to the gap 5 and carries an annulus of comminuting teeth 7b separated by tooth spaces 8 and provided with cutting edges 9 which cooperate with cutting edges 12 on an annulus of teeth 10a forming part of a stationary second cutting member 10. The teeth 7b extend in a direction away from the gap 5 and the tooth spaces 8 and 12 may be parallel with or inclined relative to the axis of the cutting member 7. The statoinary cutting member 10 is axially movably received in a cylindrical wall 2a of the housing 2 and is provided with an axially parallel groove 10b for a pin 2b serving to hold the annulus of teeth 10a against rotation. A ring-shaped retainer 14 is affixed to the cylindrical wall 2a and overlies the stationary cutting member 10 to hold it against axial movement. A sealing gasket 13 of rubber or like elastomeric material is interposed between the retainer 14 and cutting member 10, and the retainer carries a hopper 15 which serves to feed raw or cooked meat or another substance into the space surrounded by the teeth 7b of the rotary cutting member 7. Such material descends onto the upper surface of the platform 7a and is propelled radially outwardly by centrifugal force to pass between the cooperating cutting edges 9 and 12 and to thereby undergo a desirable communicating action. Comminuted material accumulates in a chamber 11 and is evacuated through an outlet 2c of the housing 2.

In accordance with a feature of my invention, particles of comminuted material which penetrate into the gap 5 are expelled by one or more jets of water or other washing fluid which is admitted through the discharge end of a bore or passage 16 machined into the wall 3 and extending substantially radially of the rotary cutting member 7. The housing 2 is provided with or carries a nipple 17 which is located radially outwardly of the cutting member 7 and whose bore communicates with the intake end of the passage 16 and can receive a stream of washing fluid through a hose 18 or an analogous conduit. The jet or jets discharged by the passage 16 will be directed toward the output shaft 4 and the expulsion of comminuted material will be enchanced if the drive motor 1 is turned on so that the cutting member 7 rotates. It will be seen that the gap 5 can be cleaned without necessitating even parial dismantling of the apparatus. Heretofore, the outer surface of the wall 3 was accessible upon detachment of hopper 15, retainer 14, stationary cutting member 10, and rotary cutting member 7. The gap 5 is necessary to avoid excessive friction between the stationary and rotary parts of the comminuting apparatus.

It is clear that the housing 2 may be provided with two or more passages 16 and that each such passage may admit a different washing fluid, for example, steam, cold water, hot water or tepid water. Also, the hose 18 may be provided wtih suitable valve means to regulate the flow of washing fluid into the passage. FIG. 1 shows that the passage 16 is slightly inclined with reference to a horizontal plane so that the jet of washing fluid issuing from this passage impinges against the lower surface of the platform 7a.

Without further analysis, the foregoing will so fully reveal the gist of the prsent invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a comminuting apparatus for meat or the like, a housing including a peripheral side wall and a bottom wall provided with an upper surface; a rotary cutting member having a lower surface adjacent to but slightly spaced from said upper surface of said bottom wall so that such surfaces face one another and define between themselves a gap, said cutting member also having a circumferential edgeface proximal to said side wall and said gap being located downwardly of said edgeface and inaccessible, said housing being provided with a passage having a discharge end in communication with said gap; and means for admitting a washing fluid into said passage and thereby into said gap.

2. A structure as set forth in claim 1, wherein said fluid admitting means comprises a nipple provided on said housing and conduit means for admitting fluid into said nipple, said nipple having a bore communicating with said passage and said passage being provided in said wall.

3. A structure as set forth in claim 1, wherein said passage extends substantially radially of said cutting member and is provided in said bottom wall.

4. A structure as set forth in claim 1, wherein said bottom wall is disposed in a substantially horizontal plane and said upper surface is the top surface of said wall.

5. A structure as set forth in claim 1, further comprising a drive for said cutting member including a rotary output member extending through said bottom wall and connected with said cutting member.

6. A structure as set forth in claim 5, wherein the discharge end of said passage is arranged to direct washing fluid toward said output member.

7. A structure as set forth in claim 1, wherein said cutting member comprises a disk-shaped platform which is adjacent to said gap and is provided with the respective outer surface, said cutting member further comprising an annulus of teeth extending from the marginal portion of said platform away from said gap and defining said edge face.

8. A structure as set forth in claim 7, further comprising a second cutting member fixed to said housing and having an annulus of teeth concentrically surrounding the teeth of said first mentioned cutting member.

9. A structure as set forth in claim 1, wherein the discharge end of said passage is arranged to direct washing fluid against said lower surface of said cutting member.

10. A structure as set forth in claim 1, wherein said fluid admitting means comprises a nipple having a bore communicating with said passage and carried by said housing radially outwardly of said cutting member.

References Cited

UNITED STATES PATENTS

| | | | |
|---|---|---|---|
| 1,730,517 | 10/1929 | McCathron | 146—50 |
| 2,952,287 | 9/1960 | Clasen | 146—50 |
| 3,291,399 | 12/1966 | Shepherd | 241—46 X |

FOREIGN PATENTS 209,507 7/1957 Australia.

W. GRAYDON ABERCROMBIE, *Primary Examiner.*

U.S. Cl. X.R.

241—46